United States Patent
Hahn et al.

(10) Patent No.: US 9,749,982 B2
(45) Date of Patent: Aug. 29, 2017

(54) METHOD AND APPARATUS FOR UPDATING TRACKING AREA IN WIRELESS COMMUNICATION SYSTEM INCLUDING MOBILE RELAY NODE

(75) Inventors: Gene Beck Hahn, Gyeonggi-do (KR); Jian Xu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 640 days.

(21) Appl. No.: 14/003,843

(22) PCT Filed: Feb. 2, 2012

(86) PCT No.: PCT/KR2012/000807
§ 371 (c)(1),
(2), (4) Date: Sep. 9, 2013

(87) PCT Pub. No.: WO2012/124894
PCT Pub. Date: Sep. 20, 2012

(65) Prior Publication Data
US 2013/0344890 A1    Dec. 26, 2013

Related U.S. Application Data (60) Provisional application No. 61/453,556, filed on Mar. 17, 2011.

(51) Int. Cl.
*H04W 64/00* (2009.01)
*H04W 60/00* (2009.01)
(Continued)

(52) U.S. Cl.
CPC .......... *H04W 64/00* (2013.01); *H04W 60/00* (2013.01); *H04W 28/08* (2013.01); *H04W 84/047* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2008/0102896 A1* | 5/2008 | Wang | H04W 36/34 455/560 |
| 2010/0260096 A1 | 10/2010 | Ulupinar et al. | |
| (Continued) | | | |

FOREIGN PATENT DOCUMENTS

CN    WO 2010124458 A1 *    11/2010    ............ H04W 68/02

OTHER PUBLICATIONS

International Search Report issued in International Patent Application No. PCT/KR2012/000807 dated Aug. 28, 2012.

*Primary Examiner* — Charles Appiah
*Assistant Examiner* — Margaret G Mastrodonato
(74) *Attorney, Agent, or Firm* — Morgan, Lewis & Bockius LLP (57) ABSTRACT

A method for updating a tracking area in a wireless communication system is provided. The method may be performed between a mobile relay node and a user equipment. The mobile relay node transmits a tracking area change message to a user equipment (UE) on the mobile relay node, receives a tracking area change response message from the UE as a response to the tracking area change message, transmits a tracking area update (TAU) request message to a donor evolved NodeB (DeNB), receives a TAU accept message from a mobility management entity (MME), and transmits a TAU complete message to the UE.

8 Claims, 9 Drawing Sheets

(51) Int. Cl.
*H04W 28/08* (2009.01)
*H04W 84/04* (2009.01)
*H04W 92/20* (2009.01)

(56) References Cited

U.S. PATENT DOCUMENTS

| | | | |
|---|---|---|---|
| 2010/0311419 A1* | 12/2010 | Bi | H04W 60/00 455/435.1 |
| 2010/0322197 A1 | 12/2010 | Adjakple et al. | |
| 2011/0002304 A1 | 1/2011 | Lee et al. | |
| 2011/0075675 A1* | 3/2011 | Koodli | H04L 12/14 370/401 |
| 2012/0039246 A1 | 2/2012 | Zhang et al. | |

* cited by examiner

METHOD AND APPARATUS FOR UPDATING TRACKING AREA IN WIRELESS COMMUNICATION SYSTEM INCLUDING MOBILE RELAY NODE

TECHNICAL FIELD

The present invention relates to wireless communication, and more particularly, to a method and apparatus for updating a tracking area in a wireless communication system including a mobile relay node.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Figure 1:
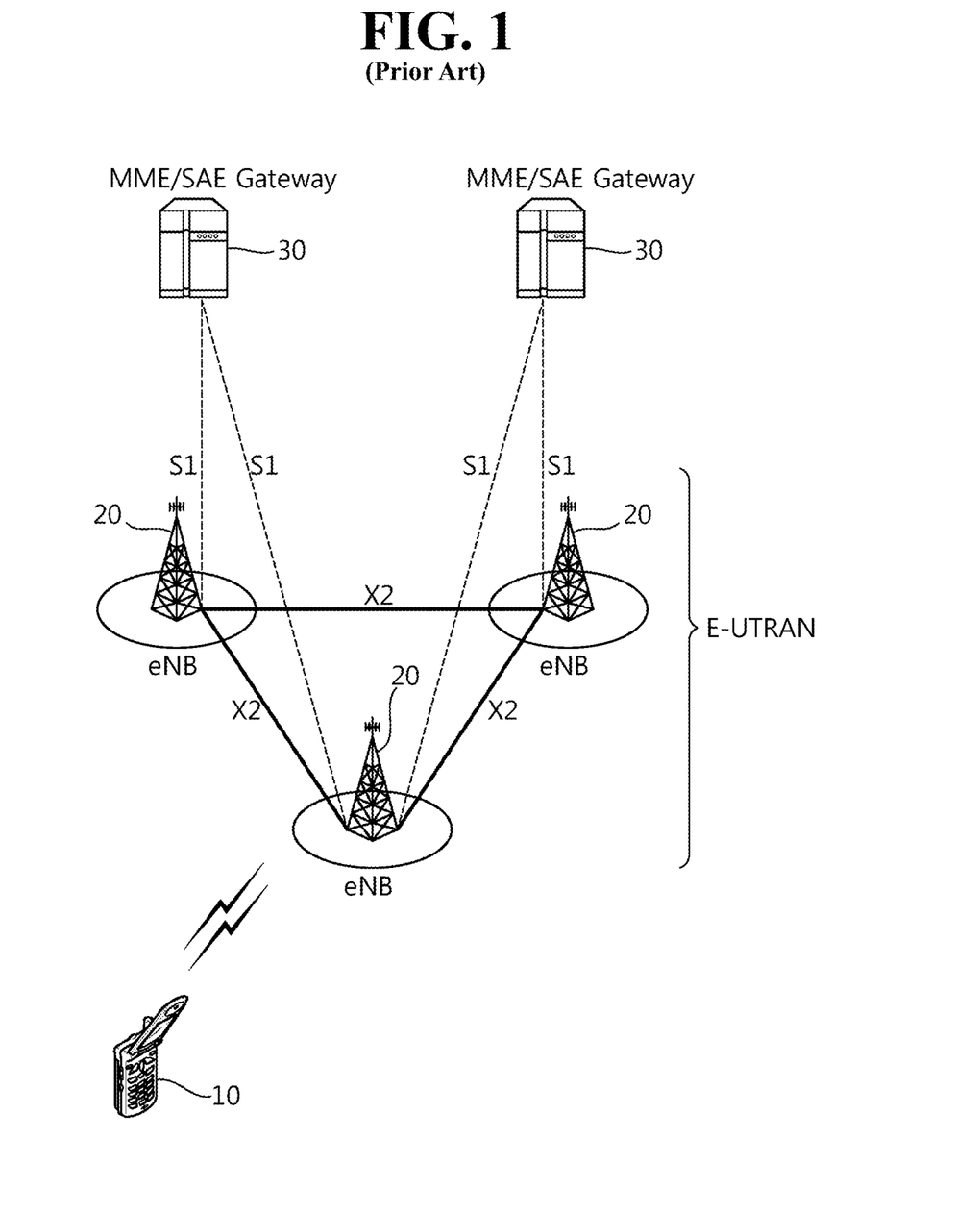
FIG. 1 shows network structure of an evolved universal mobile telecommunication system (E-UMTS).

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS security control, Inter CN node signaling for mobility between 3GPP access networks, Idle mode UE reachability (including control and execution of paging retransmission), tracking area list management (for UE in idle and active mode), PDN GW and serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including per-user based packet filtering (by e.g. deep packet inspection), lawful interception, UE IP address allocation, transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
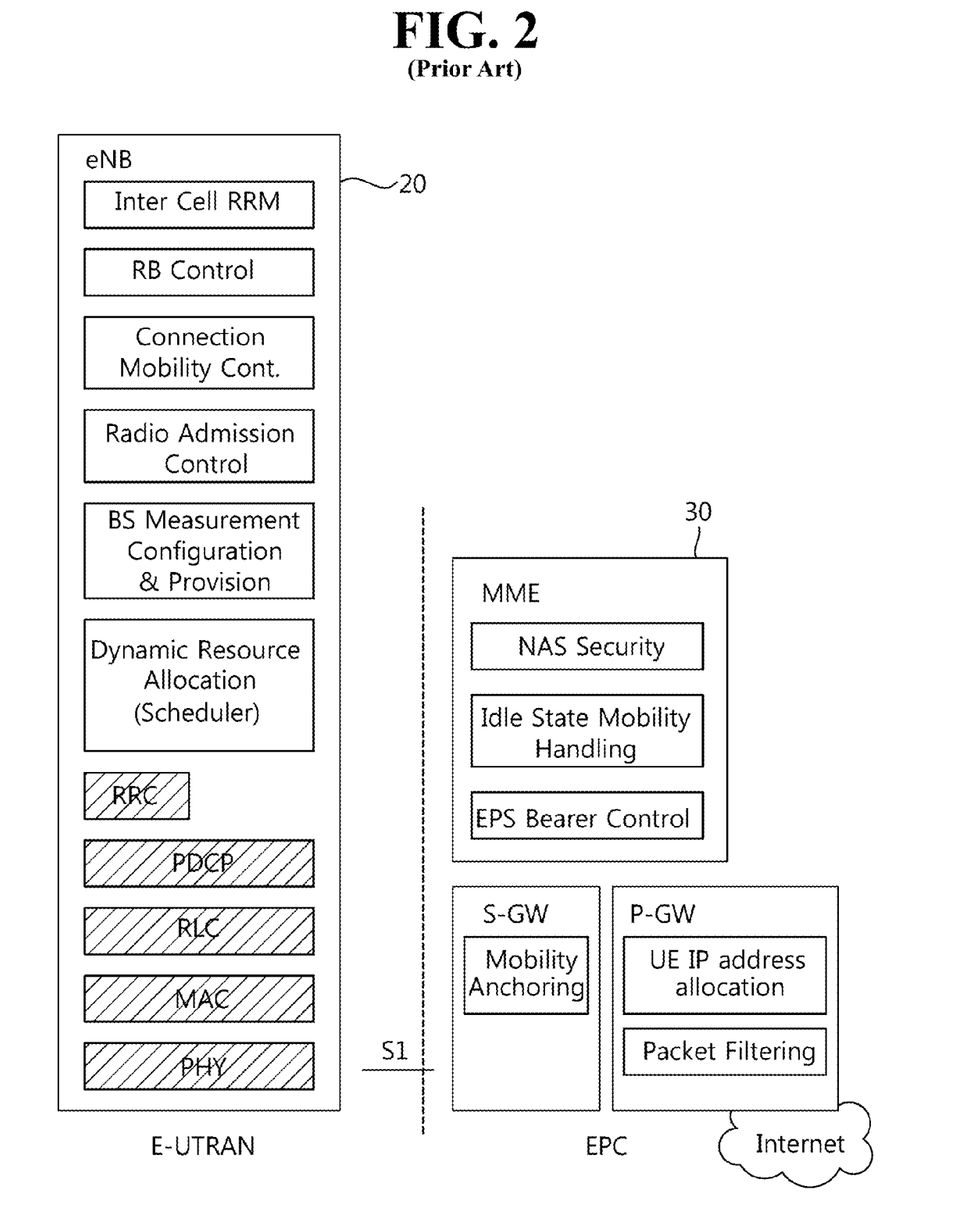
FIG. 2 shows architecture of a typical E-UTRAN and a typical EPC.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, system architecture evolution (SAE) bearer control, and ciphering and integrity protection of non-access stratum (NAS) signaling.

Figure 3:
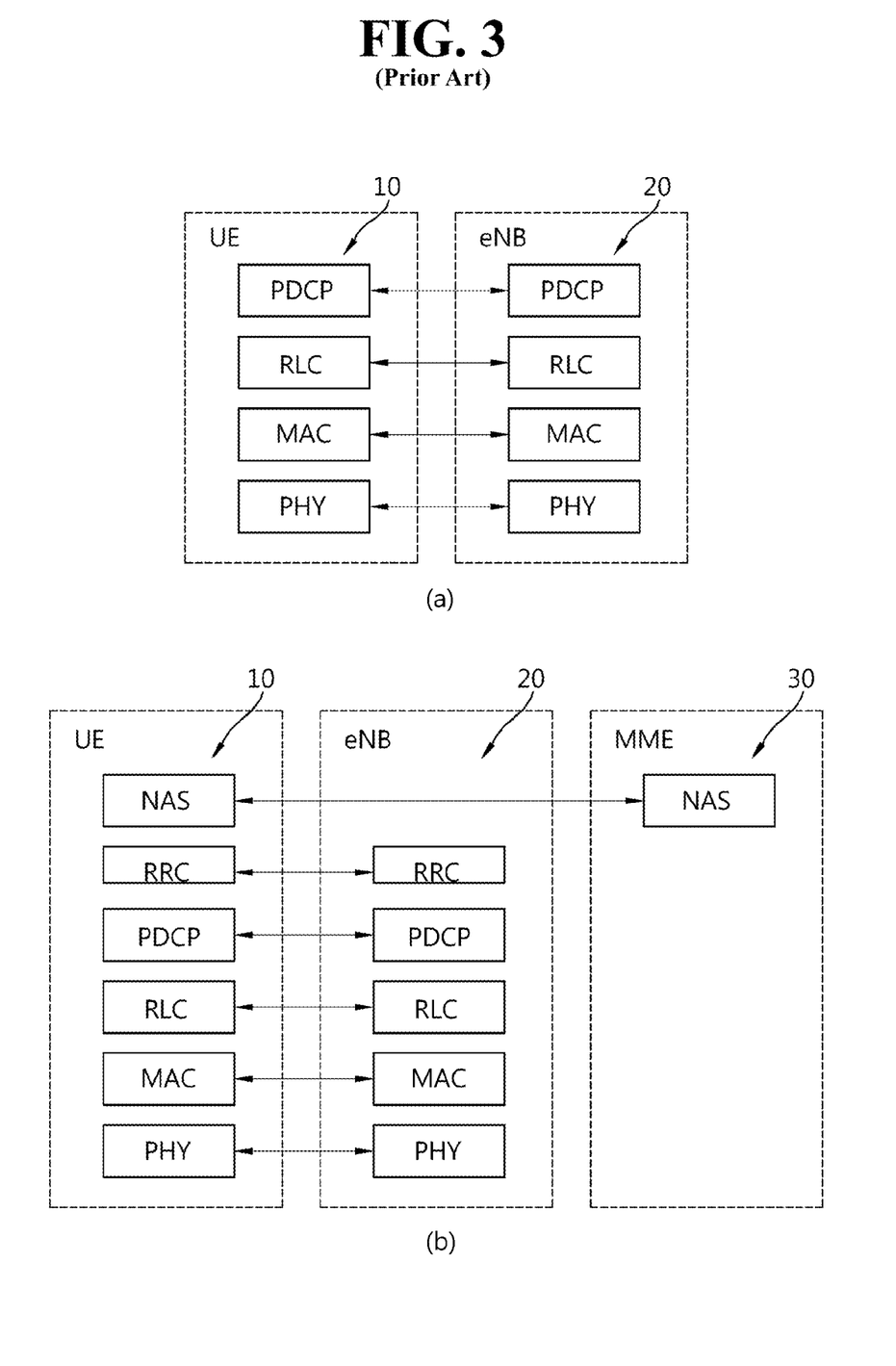
FIG. 3 shows a user-plane protocol and a control-plane protocol stack for the E-UMTS.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, radio bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 4:
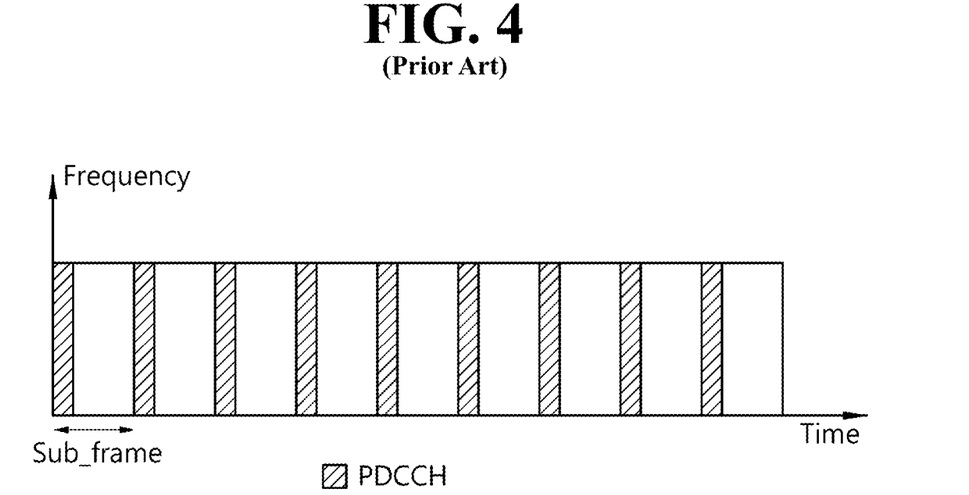
FIG. 4 shows an example of structure of a physical channel.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and MCS.

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Mobility management functions are used to keep track of a current location of a UE. For mobility of the UE, a tracking area (TA) may be defined. The location of the UE may be known by a network on a tacking area list granularity. The UE may be paged in all cells of the tracking areas in which it is currently registered. The UE may be registered in multiple tracking areas. All the tracking areas in the tracking area list to which the UE is registered are served by the same serving MME.

Figure 5:
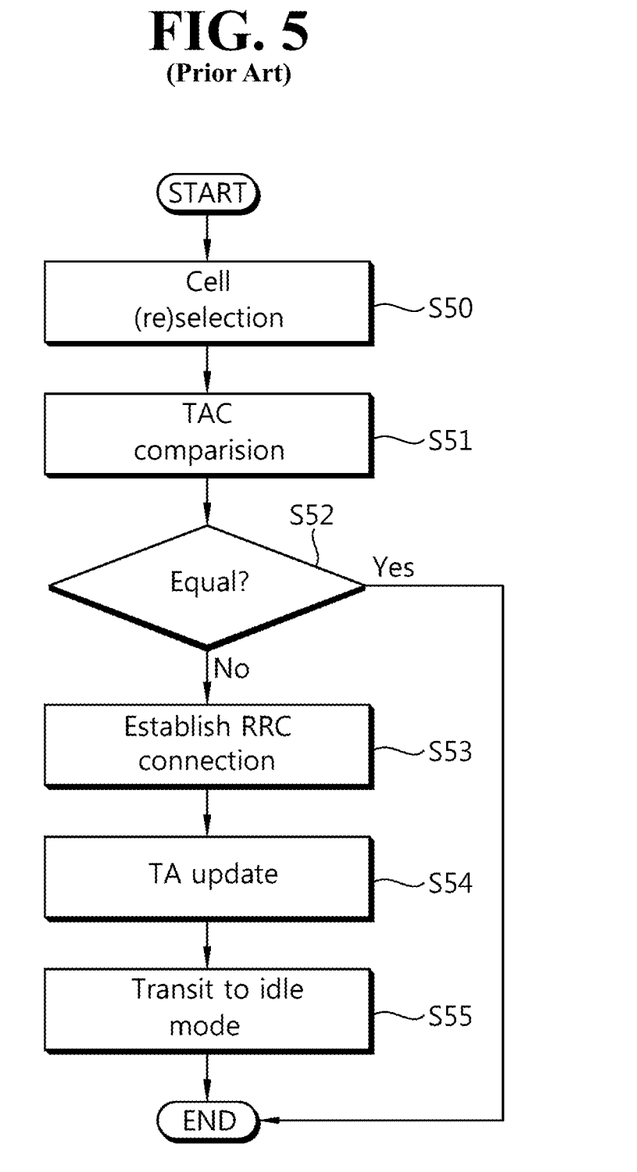
FIG. 5 shows an example of a tracking update procedure.

FIG. 5 shows an example of a tracking update procedure.

At step S50, a UE performs a cell (re)selection. At step S51, after performing the cell (re)selection, the UE compares a current tracking area code (TAC) with a previous TAC.

At step S52, the UE determines whether the current TAC is equal to the previous TAC or not. If the current TAC is equal to the previous TAC, this means that the UE remains at the current tracking area. At this time, the UE does not perform a TA update procedure.

If the current TAC is not equal to the previous TAC, this means that the UE enters a new tracking area. To reduce the cell change reporting overhead from the UE to an MME, the UE establishes a RRC connection at step S53, and at step S54, the UE performs the TA update procedure. Then, at step S55, the UE transits to an idle mode.

Meanwhile, 3GPP LTE may supports relaying by having a relay node (RN) wirelessly connect to an eNB serving the RN. The eNB serving the RN may be referred as donor eNB (DeNB). The DeNB and the RN may be connected via a modified version of the E-UTRA radio interface. The modified vision may be referred as an Un interface.

The RN may support eNB functionality. It means that the RN terminates the radio protocols of the E-UTRA radio interface, and an S1 and X2 interfaces. The functionality defined for eNBs may also be applied to RNs. In addition to the eNB functionality, the RN may also support a subset of UE functionality, e.g, a physical layer, layer-2, RRC, and NAS functionality, in order to wirelessly connect to the DeNB.

The relay node may be classified to a fixed relay node and a mobile relay node. One of the possible deployment scenarios of mobile relay node is high speed public transportation, e.g, a high speed railway. Hence, it is easily expected that the provision of various good quality services towards the users on a high speed public transportation will be important. Meanwhile, the service requirements offered by the fixed relay node seem to be different from those offered by the mobile relay node. So, there might be a few of considerations that should be resolved in the mobile relay node. The solutions to resolve these considerations for mobile relay node may have impacts on radio a radio access network (RAN).

The TA update procedure should be performed in a wireless communication system supporting the mobile relay node. The previous TA update procedure shown in FIG. 5 above reduces the TA update reporting overhead while increasing the paging overhead. Accordingly, the MME has to broadcast a paging message in many cells. However, considering the UE on the mobile relay node attached to the high speed public transportation, the previous current TA update procedure may incur excessive signaling overhead when the TA update procedure is performed on per UE basis. In addition, the UE cannot detect the cell change since because the cell of mobile relay node seems to be the current cell as long as the UE is attached to the mobile relay from the UE perspective.

Therefore, a method of enhancing the previous TA update procedure for the UE on the mobile relay node of the high speed public transportation should be required.

SUMMARY OF INVENTION

Technical Problem

The present invention provides a method and apparatus for updating a tracking area in a wireless communication system including a mobile relay node. The present invention provides a method of updating a tracking area by the mobile relay node, and notifying the result of the update of the tracking area to a user equipment.

Technical Solution

In an aspect, a method for updating, by a mobile relay node, a tracking area in a wireless communication system is provided. The method includes transmitting a tracking area change message to a user equipment (UE) on the mobile relay node, receiving a tracking area change response message from the UE as a response to the tracking area change message, on receiving the tracking area change response message from the UE, transmitting a tracking area update (TAU) request message to a donor evolved NodeB (DeNB), receiving a TAU accept message from a mobility management entity (MME), and transmitting a TAU complete message to the UE.

The tracking area change message may indicate that the mobile relay node has entered into a new tacking area that is not in a list of tracking area identities (TAIs) that the mobile relay node registered with a network.

The tracking area change message may be transmitted through system information.

The TAU request message may include a list of UEs on the mobile relay node.

The TAU request message may include related information on the UE, the related information comprising UE core network capability, old globally unique temporary identity (GUTI), last visited TAI, evolved packet system (EPS) bearer status, and radio resource control (RRC) parameters.

The TAU request message may be a non-stratum access (NAS) message carrying a UE-MME signaling over an S1 interface.

The TAU request message may be forwarded from the DeNB to the MME.

The TAU accept message may include a list of UEs on the mobile relay node.

The TAU complete message may indicate the result of successful completion of a TAU procedure.

In another aspect, a method for updating, by user equipment, a tracking area in a wireless communication system is provided. The method includes receiving a tracking area change message from a mobile relay node, the user equipment being on the mobile relay node, transmitting a tracking area change response message to the mobile relay node as a response to the tracking area change message, and receiving a TAU complete message from the mobile relay node.

The tracking area change message may indicate that the mobile relay node has entered into a new tacking area that is not in a list of tracking area identities (TAIs) that the mobile relay node registered with a network.

The tracking area change message may be transmitted through system information.

The TAU complete message may indicate the result of successful completion of a TAU procedure.

Advantageous Effects

A tracking area can be updated by a mobile relay node.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 6:
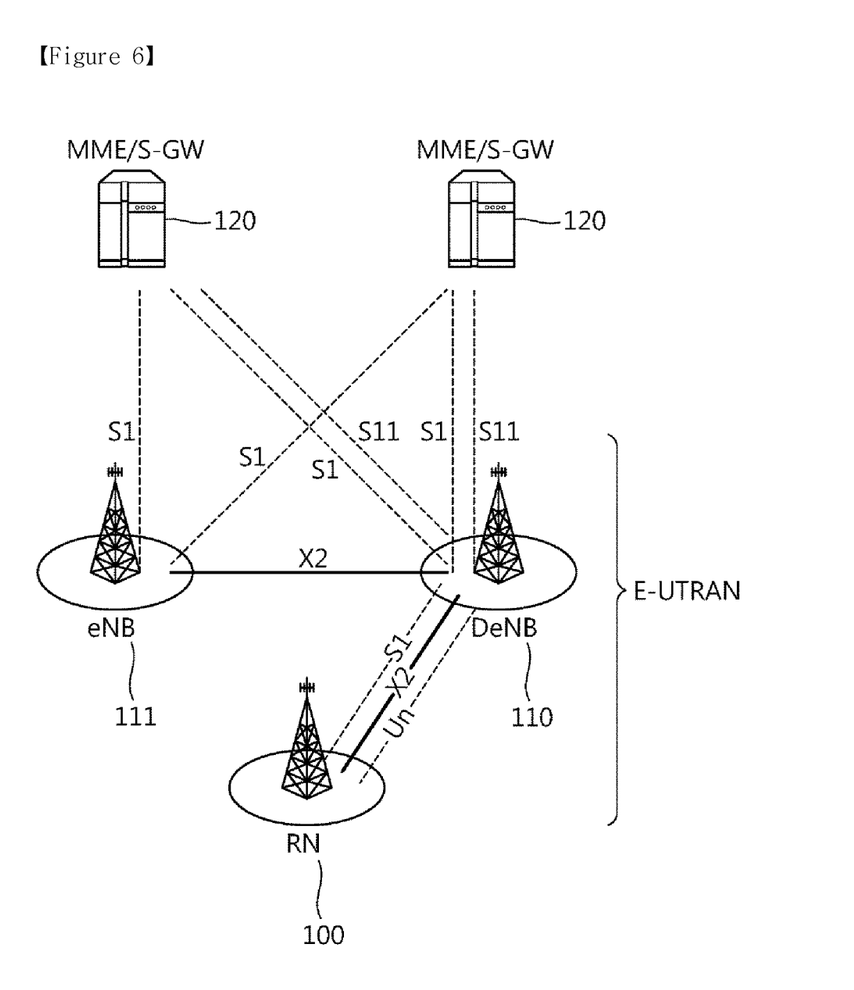
FIG. 6 a block diagram illustrating network structure of an LTE-A system introducing a relay system.

FIG. 6 a block diagram illustrating network structure of an LTE-A system introducing a relay system.

Referring to FIG. 6, the LTE-A network includes an evolved UMTS terrestrial radio access network (E-UTRAN), an evolved packet core (EPC) and one or more user equipment (not described). The E-UTRAN may include one or more evolved NodeB (eNB) 111, one or more donor eNB (DeNB) 110, one or more relay node (RN) 100 and a plurality of user equipment (UE) may be located in one cell. One or more E-UTRAN mobility management entity (MME)/system architecture evolution (SAE) gateways (S-GW) 120 may be positioned at the end of the network and connected to an external network.

As used herein, "downlink" refers to communication from the eNB 111 to the UE, from the DeNB 110 to the UE or from the RN 100 to the UE, "uplink" refers to communication from the UE to the eNB 111, from the UE to the DeNB 110 or from the UE to the RN 100. The UE refers to communication equipment carried by a user and may be also referred to as a mobile station (MS), a user terminal (UT), a subscriber station (SS) or a wireless device.

The eNB 111 and the DeNB 110 provide end points of a user plane and a control plane to the UE. MME/S-GW 120 provides an end point of a session and mobility management function for UE. The eNB 111 and the MME/S-GW 120 may be connected via an S1 interface. The DeNB 110 and MME/SAE gateway 120 may be connected via an S1 interface. The eNBs 111 may be connected to each other via an X2 interface and neighboring eNBs may have a meshed network structure that has the X2 interface. The eNB 111 and the DeNB 110 may be connected to each other via an X2 interface The RN 100 may be wirelessly connected to the DeNB 110 via a modified version of the E-UTRA radio interface being called the Un interface. That is, the RN 100 may be served by the DeNB 110. The RN 100 may support the eNB functionality which means that it terminates the S1 and X2 interfaces. Functionality defined for the eNB 111 or the DeNB 110, e.g. radio network layer (RNL) and transport network layer (TNL), may also apply to RNs 100. In addition to the eNB functionality, the RN 100 may also support a subset of the UE functionality, e.g. physical layer, layer-2, radio resource control (RRC), and non-access stratum (NAS) functionality, in order to wirelessly connect to the DeNB.

The RN 100 may terminate the S1, X2 and Un interfaces. The DeNB 110 may provide S1 and X2 proxy functionality between the RN 100 and other network nodes (other eNBs, MMEs and S-GWs). The S1 and X2 proxy functionality may include passing UE-dedicated S1 and X2 signaling messages as well as GTP data packets between the S1 and X2 interfaces associated with the RN 100 and the S1 and X2 interfaces associated with other network nodes. Due to the proxy functionality, the DeNB 110 appears as an MME (for S1) and an eNB (for X2) to the RN. The DeNB 110 may also embed and provides the S-GW/P-GW-like functions needed for the RN operation. This includes creating a session for the RN 100 and managing EPS bearers for the RN 100, as well as terminating the S11 interface towards the MME serving the RN 100. The RN and the DeNB may also perform mapping of signaling and data packets onto EPS bearers that are setup for the RN. The mapping may be based on existing QoS mechanisms defined for the UE and the P-GW.

A tracking update (TA) update procedure is described below.

Figure 7:
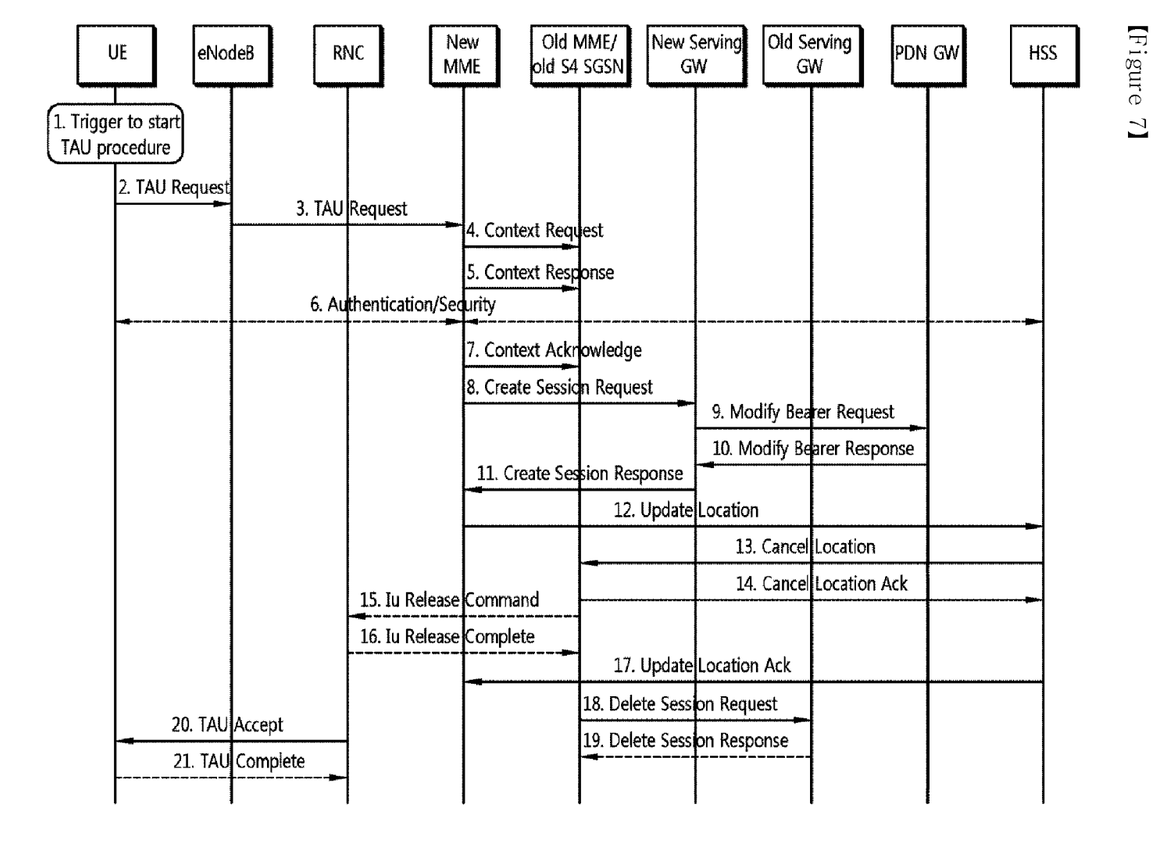
FIG. 7 shows an example of a tracking area update procedure with serving GW change.

FIG. 7 shows an example of a tracking area update procedure with serving GW change.

1. Starting the TA update procedure is triggered.

2. The UE initiates the TA update procedure by sending, to the eNodeB, a TAU request message together with RRC parameters indicating the selected network and the old globally unique MME identity (GUMMEI). The TAU request message may include UE core Network capability, old globally unique temporary identity (GUTI), last visited tracking update identity (TAI), active flag, EPS bearer status, packet temporary mobile subscriber identity (P-TMSI) signature, additional GUTI, evolved key set identity (eKSI), NAS sequence number, NAS-MAC and KSI.

The additional GUTI in the TAU request message allows the new MME to find any already existing UE context stored in the new MME when the old GUTI indicates a value mapped from a P-TMSI and RAI. The last visited TAI may included in the TAU request message in order to help the MME produce a good list of TAIs for any subsequent TAU accept message. The selected network indicates the network that is selected. Active flag is a request by the UE to activate the radio and S1 bearers for all the active EPS bearers by the TAU procedure when the UE is in ECM-IDLE state. The EPS bearer status indicates each EPS bearer that is active in the UE. The TAU Request message shall be integrity protected by the NAS-MAC. The eKSI, the NAS sequence number and the NAS-MAC are included if the UE has valid EPS security parameters. The NAS sequence number indicates the sequential number of the NAS message. The KSI is included if the UE indicates a GUTI mapped from a P-TMSI in the information element "old GUTI".

3. The eNodeB derives the MME from the RRC parameters carrying the old GUMMEI and the indicated selected network. The eNodeB forwards the TAU request message to the new MME.

4. The new MME uses the GUTI received from the UE to derive the old MME/S4 SGSN address, and sends a context request message to the old MME/old S4 SGSN to retrieve user information. The context request message may include old GUTI, complete TAU request message, P-TMSI signature, MME address, and UE validated. The UE Validated indicates that the new MME has validated the integrity protection of the TAU message, e.g. based on native EPS security context for the UE. To validate the context request message, the old MME uses the complete TAU request message and the old S4 SGSN uses the P-TMSI signature and responds with an appropriate error if integrity check fails in old MME/S4 SGSN. This shall initiate the security functions in the new MME.

5. If the context request message is sent to an old MME, the old MME responds with a context response message. The context response message may include IMSI, ME identity (if available), mobile station international subscriber directory number (MSISDN), MM Context, EPS Bearer Context(s), serving GW signaling address and TEID(s), ISR supported, MS info change reporting action (if available), CSG information reporting action (if available), UE core network capability, UE specific DRX parameters. If the context request is sent to an old S4 SGSN, the old S4 SGSN responds with a context response message. The context response message may include MM context, EPS bearer context(s), serving GW signaling address and TEID(s), ISR supported, MS info change reporting action (if available), CSG information reporting action (if available), UE core network capability, UE specific DRX Parameters.

The MM context contains security related information as well as other parameters (including IMSI, ME Identity (if available) and MSISDN)). The unused authentication quintets in the MM context are also maintained in the SGSN. The PDN GW address and TEID(s) or GRE Keys and the TI(s), is part of the EPS Bearer Context. If the UE is not known in the old MME/old S4 SGSN or if the integrity check for the TAU request message fails, the old MME/old S4 SGSN responds with an appropriate error cause. The ISR supported is indicated if the old MME/old S4 SGSN is capable to activate ISR for the UE. The MSISDN is included if the old MME/old S4 SGSN has it stored for that UE.

6. If the integrity check of TAU request message (sent in step 2) failed, then authentication is mandatory.

7. The MME (if the MME has changed then it is the new MME) determines to relocate the serving GW. The serving GW is relocated when the old serving GW cannot continue to serve the UE. The MME may also decide to relocate the serving GW if a new serving GW is expected to serve the UE longer and/or with a more optimal UE to PDN GW path, or if a new serving GW can be co-located with the PDN GW.

If the MME has changed, the new MME sends a context acknowledge (serving GW change indication) message to the old MME/old S4 SGSN. The serving GW change indication indicates a new serving GW has been selected. The old MME/old S4 SGSN marks in its UE context that the information in the GWs is invalid. And, if the old node is an MME, the old MME marks in its UE context that the information in the HSS is invalid. This ensures that the old MME/old S4 SGSN updates the GWs, and the old MME updates the HSS, if the UE initiates a TAU or RAU procedure back to the old MME/old S4 SGSN before completing the ongoing TAU procedure. If the security functions do not authenticate the UE correctly, then the TAU shall be rejected, and the new MME shall send a reject indication to the old MME/old S4 SGSN. The old MME/old S4 SGSN shall continue as if the identification and the context request message were never received.

8. If the MME has changed, the new MME verifies the EPS bearer status received from the UE with the bearer contexts received from the old MME/old S4 SGSN. If the MME has not changed, the MME verifies EPS bearer status from the UE with the bearer contexts available in the MM context. The MME releases any network resources related to EPS bearers that are not active in the UE. If there is no bearer context at all, the MME rejects the TAU request.

If the MME selected a new serving GW, it sends a create session request message per PDN connection to the selected new Serving GW. The create session request message may include IMSI, bearer contexts, MME address and TEID, type, the protocol type over S5/S8, RAT type, and serving network. The PDN GW address and TFT are indicated in the bearer contexts. The type indicates to the serving GW to send the create session request message to the PDN GW. The Protocol Type over S5/S8 is provided to the serving GW which protocol should be used over S5/S8 interface. The RAT type indicates a change in radio access.

9. The serving GW informs the PDN GW(s) about the change of for example the RAT type that e.g. can be used for charging, by sending a modify bearer request message per PDN connection to the PDN GW(s) concerned. The modify bearer request message may include serving GW address and TEID, RAT type, and serving network.

10. The PDN GW updates its bearer contexts and returns a modify bearer response message. The modify bearer response message may include MSISDN, and charging Id. The MSISDN is included if the PDN GW has it stored in its UE context.

11. The serving GW updates its bearer context. This allows the serving GW to route bearer PDUs to the PDN GW when received from the eNodeB.

The serving GW returns a create session response message to the new MME. The create session response message may include serving GW address and TEID for user plane and control plane and PDN GW TEIDs (for GTP-based S5/S8) or GRE keys (for PMIP-based S5/S8) for uplink traffic and control plane.

12. The new MME verifies whether it holds subscription data for the UE identified by the GUTI, the additional GUTI or by the IMSI received with the context data from the old CN node. If there are no subscription data in the new MME for this UE, then the new MME sends an update location request message to the HSS. The update location request message may include MME identity, IMSI, ULR-flags, MME capabilities, homogeneous support of IMS over PS sessions. The ULR-Flags indicates that update location is sent from an MME and the MME registration shall be updated in HSS. The HSS does not cancel any SGSN registration. The MME capabilities indicate the MME's support for regional access restrictions functionality. The homogenous support of IMS over PS sessions indicates whether or not "IMS voice over PS sessions" is supported homogeneously in all TAs the serving MME.

13. The HSS sends a cancel location message to the old MME with cancellation type set to update procedure. The cancel location message may include IMSI, and cancellation type.

14. If the timer started in step 4 is not running, the old MME removes the MM context. Otherwise, the contexts are removed when the timer expires. It also ensures that the MM context is kept in the old MME for the case the UE initiates another TAU procedure before completing the ongoing TAU procedure to the new MME. The old MME acknowledges with a cancel location Ack message. The cancel location Ack message may include IMSI.

15. When the old S4 SGSN receives the context acknowledge message and if the UE is in Iu connected, the old S4 SGSN sends an Iu release command message to the RNC after the timer started in step 4 has expired.

16. The RNC responds with an Iu release complete message.

17. The HSS acknowledges the update location request message by sending an update location Ack message to the new MME. The update location Ack message may include IMSI, subscription data. If the update location is rejected by the HSS, the new MME rejects the TAU request from the UE with an appropriate cause. The subscription data may contain the CSG subscription data for the PLMN.

18. If the MME has changed, when the timer started in step 4 expires the old MME/old S4 SGSN releases any local MME or SGSN bearer resources and if it received the serving GW change indication in the context acknowledge message, the old MME/old S4 SGSN deletes the EPS bearer resources by sending a delete session request messages to the old serving GW. The delete session request message may include cause. The cause indicates to the old serving GW that the old serving GW shall not initiate a delete procedure towards the PDN GW. If ISR is activated, the cause also indicates to the old S-GW that the old S-GW shall delete the bearer resources on the other old CN node by sending the delete bearer request message to that CN node. If the MME has not changed, step 11 triggers the release of EPS bearer resources when a new serving GW is allocated.

19. The serving GW acknowledges with a delete session response message. The delete session response message may include cause. The serving GW discards any packets buffered for the UE.

20. The MME sends a TAU accept message to the UE. The TAU accept message may include GUTI, TAI list, EPS bearer status, NAS sequence number, NAS-MAC, IMS voice over PS session supported, emergency service support indicator, and LCS support indication. If the active flag is set, the MME may provide the eNodeB with handover restriction list. The GUTI is included if the MME allocates a new GUTI. If the "active flag" is set in the TAU request message, the user plane setup procedure can be activated in conjunction with the TAU accept message. The MME indicates the EPS bearer status IE to the UE. The UE removes any internal resources related to bearers that are not marked active in the received EPS bearer status.

21. If the GUTI was included in the TAU accept message, the UE acknowledges the received message by returning a TAU complete message to the MME.

Figure 8:
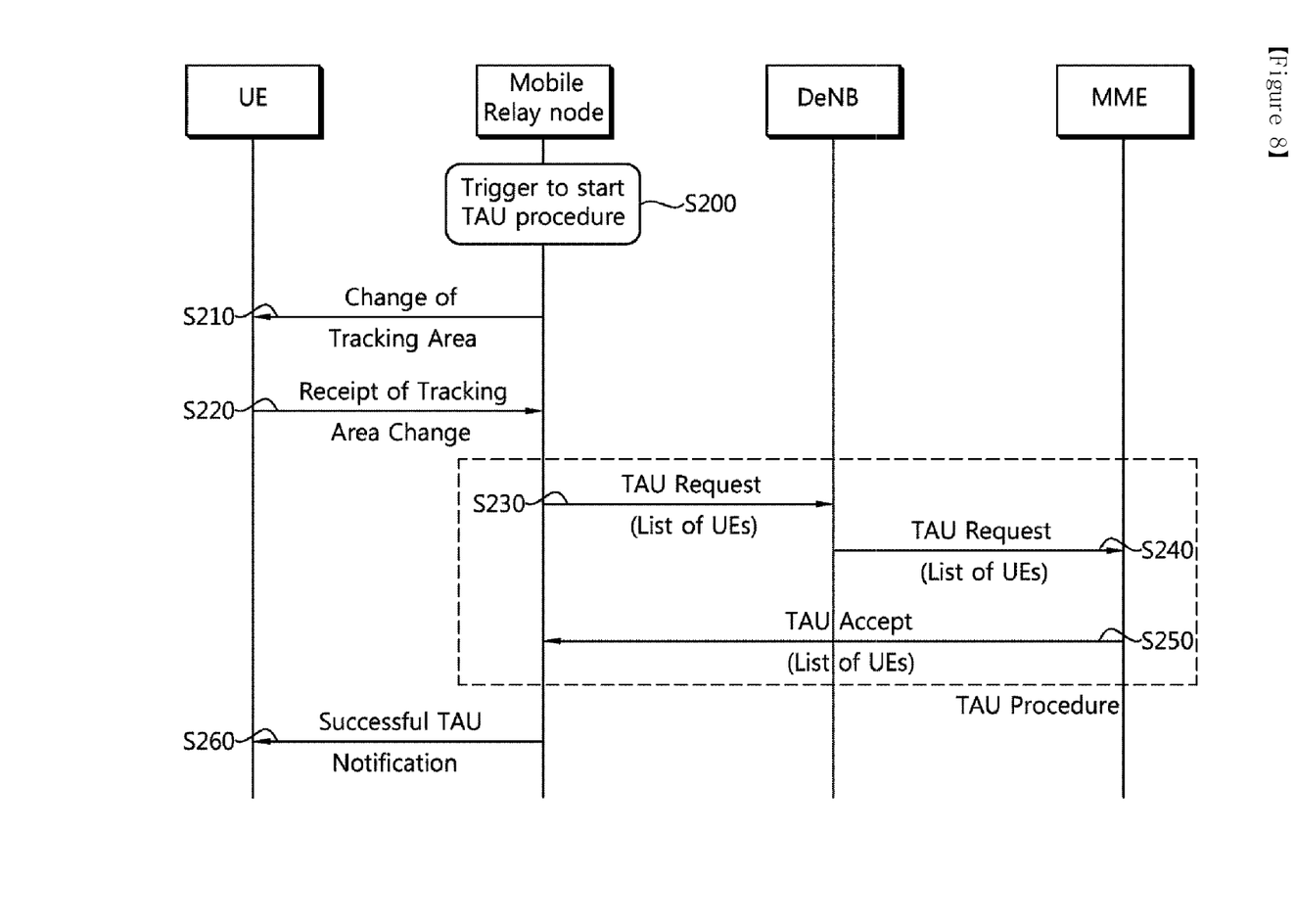
FIG. 8 shows an example of a simplified tracking area update procedure according to an embodiment of the present invention.

FIG. 8 shows an example of a simplified tracking area update procedure according to an embodiment of the present invention.

At step S200, if the mobile relay node detect that it has entered into a new tracking area that is not in the list of TAIs that the mobile relay node registered with the network, the mobile relay node triggers to start TAU procedure.

At step S210, the mobile relay node notifies the UE of a change of a tracking area by transmitting a tracking area change message. The tracking area change message may be transmitted through system information. At step S220, the UE responds to the tracking area change message by transmitting a tracking area change response message.

On receiving the tracking area change response message from the UE, the mobile relay node initiates and performs a track area update procedure on behalf of the UE on it. Here, the tracking area update procedure is performed for the UE whose list of TAIs is covered by the list of TAIs managed by the mobile relay node.

At step S230, the mobile relay node generates a TAU request message, and transmits the TAU request message to the DeNB. The TAU request message may be a NAS message carrying a UE-MME signaling over an S1 interface. The TAU request message may include a list of UEs on the mobile relay node of high speed public transportation. The TAU request message may also include the related information regarding the UE. The related information may include UE core network capability, old GUTI, last visited TAI, EPS bearer status, and RRC parameters. At step S240, the DeNB forwards the received TAU request message to the MME. At step S250, the MME transmits a TAU accept message to the mobile relay node. The TAU accept message may include the list of UEs.

At step S260, the mobile relay node notifies the UE of the successful completion tracking area update procedure by transmitting a tracking area update complete message.

Referring FIG. 8, from the perspective of the UE, the UE can skip a cell (re)selection procedure, being different from the previous TA update procedure, because the UE persistently looks for the mobile relay node as long as the UE are on the mobile relay node. On receiving the tracking area update complete message from the mobile relay node, the UE detects that it has entered a new tracking area that is not in the list of TAIs that the UE registered with the network without performing the tracking area update procedure.

Figure 9:
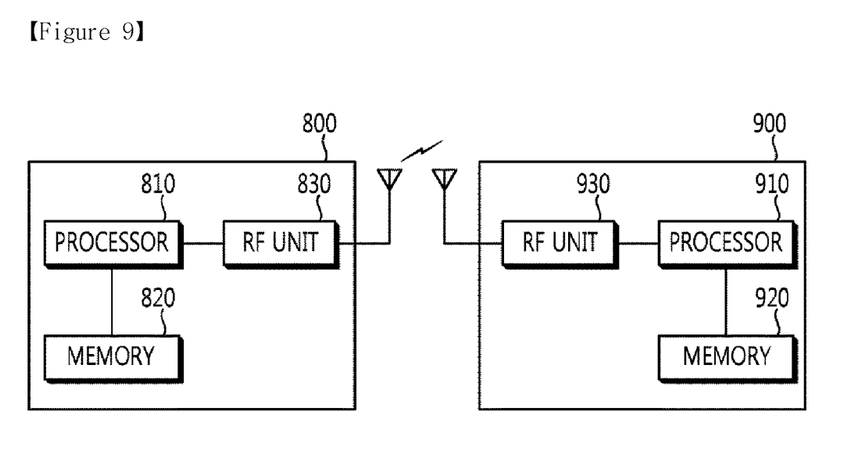
FIG. 9 is a block diagram showing wireless communication system to implement an embodiment of the present invention.

FIG. 9 is a block diagram showing wireless communication system to implement an embodiment of the present invention.

A mobile relay node 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for updating a tracking area in a wireless communication system, the method comprising:
    determining, by a mobile relay node, to trigger a tracking area update (TAU) procedure when the mobile relay node moves to a new tracking area that is not in a list of tracking area identities (TAIs);
    transmitting, by the mobile relay node, in response to the determining to trigger the TAU procedure, a tracking area change message to a plurality of user equipments (UEs) served by the mobile relay node, the tracking area change message indicating that a tracking area in which the mobile relay node is located is changed;
    receiving, by the mobile relay node, a tracking area change response message from the plurality of UEs as a response to the tracking area change message;
    upon receiving the tracking area change response message from the plurality of UEs, generating and transmitting, by the mobile relay node in response to the determining to trigger the TAU procedure, a TAU request message including a list of the plurality of UEs to a donor evolved NodeB (DeNB), the TAU request message being generated and transmitted by the mobile relay node on behalf of the plurality of UEs, such that the plurality of UEs do not need to perform the TAU procedure;
    receiving a TAU accept message from a mobility management entity (MME); and
    transmitting a TAU complete message to the plurality of UEs, such that the plurality of UEs detect to enter the new tracking area without performing the TAU procedure.

2. The method of claim 1, wherein the tracking area change message indicates that the mobile relay node has entered into the new tracking area that is not in the list of TAIs that the mobile relay node registered with a network.

3. The method of claim 1, wherein the tracking area change message is transmitted through system information.

4. The method of claim 1, wherein the TAU request message includes related information on the UE, the related information comprising UE core network capability, old globally unique temporary identity (GUTI), last visited TAI, evolved packet system (EPS) bearer status, and radio resource control (RRC) parameters.

5. The method of claim 1, wherein the TAU request message is a non-stratum access (NAS) message carrying a UE-MME signaling over an S1 interface.

6. The method of claim 1, wherein the TAU request message is forwarded from the DeNB to the MME.

7. The method of claim 1, wherein the TAU accept message includes a list of UEs on the mobile relay node.

8. The method of claim 1, wherein the TAU complete message indicates the result of successful completion of a TAU procedure.

* * * * *